United States Patent
Funk et al.

(10) Patent No.: US 8,829,135 B2
(45) Date of Patent: Sep. 9, 2014

(54) PROCESS FOR CONTINUOUSLY PRODUCING WATER-ABSORBING POLYMER PARTICLES

(75) Inventors: Rüdiger Funk, Niedernhausen (DE); Thomas Pfeiffer, Böhl-Iggelheim (DE); Jürgen Schröder, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 117 days.

(21) Appl. No.: 13/487,829

(22) Filed: Jun. 4, 2012

(65) Prior Publication Data

US 2012/0309920 A1      Dec. 6, 2012

Related U.S. Application Data

(60) Provisional application No. 61/492,827, filed on Jun. 3, 2011.

(51) Int. Cl.
  *C08F 2/10*   (2006.01)
  *C08F 20/06*  (2006.01)
  *C08F 220/06* (2006.01)

(52) U.S. Cl.
  CPC .................................. *C08F 220/06* (2013.01)
  USPC ....................................................... 526/317.1

(58) Field of Classification Search
  USPC ....................................................... 526/317.1
  See application file for complete search history.

(56) References Cited

U.S. PATENT DOCUMENTS

| | | | |
|---|---|---|---|
| 4,914,170 A | | 4/1990 | Chang et al. |
| 2006/0036043 A1* | | 2/2006 | Nestler et al. .............. 525/329.7 |
| 2010/0298513 A1 | | 11/2010 | Heide et al. |

FOREIGN PATENT DOCUMENTS

| | | |
|---|---|---|
| JP | 2004160845 A | 6/2004 |
| JP | 2004352899 A | 12/2004 |

OTHER PUBLICATIONS

Buchholz, Fredric L., et al. *Modern Superabsorbent Polymer Technology*, "Solution Polymerization: Unit Operations and Their Effect on Product Quality." New York: John Wiley & Sons, Inc., 1998, pp. 71-103.

Third Party Observation submitted Sep. 27, 2013, in international application No. PCT/EP2012/060428.

* cited by examiner

*Primary Examiner* — Vu A Nguyen
(74) *Attorney, Agent, or Firm* — Marshall, Gerstein & Borun LLP

(57) ABSTRACT

A process for continuously producing water-absorbing polymer particles, wherein the acrylic acid used to produce the polymer particles has a low purity.

17 Claims, No Drawings

PROCESS FOR CONTINUOUSLY PRODUCING WATER-ABSORBING POLYMER PARTICLES

CROSS-REFERENCE TO RELATED APPLICATIONS

This application claims the benefit of U.S. Provisional Patent Application No. 61/492,827, filed Jun. 3, 2011, incorporated herein by reference in its entirety.

The present invention relates to a process for continuously producing water-absorbing polymer particles, wherein the acrylic acid used to produce the polymer particles has a low purity.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With an increasing amount of crosslinker, the centrifuge retention capacity (CRC) falls and the absorption under a pressure of 21.0 g/cm$^2$ (AUL0.3 psi) passes through a maximum.

To improve the use properties, for example, permeability of the swollen gel bed (SFC) in the diaper and absorption under a pressure of 49.2 g/cm$^2$ (AUL0.7 psi), water-absorbing polymer particles are generally surface postcrosslinked. This increases the level of crosslinking of the particle surface, which can at least partly decouple the absorption under a pressure of 49.2 g/cm$^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

It was an object of the present invention to provide an improved process for producing water-absorbing polymer particles, more particularly a process in which relatively highly contaminated monomers can also be used.

The object was achieved by a process for continuously producing water-absorbing polymer particles, comprising the polymerization of a monomer solution or suspension comprising
  a) acrylic acid which may be at least partly neutralized,
  b) at least one crosslinker,
  c) at least one initiator,
  d) optionally one or more ethylenically unsaturated monomers copolymerizable with acrylic acid and
  e) optionally one or more water-soluble polymers,
to give a polymer gel, the drying of the resulting polymer gel, the comminution of the dried polymer gel to give polymer particles and the classification of the resulting polymer particles, wherein the acrylic acid is supplied continuously, the acrylic acid supplied continuously has a purity of less than 99.8% by weight and the purity of the acrylic acid supplied continuously varies by less than 2% by weight within 24 hours.

The purity of the acrylic acid supplied continuously is preferably from 80 to 99.5% by weight, more preferably from 90 to 99% by weight and most preferably from 95 to 98% by weight. The variation in the purity of the acrylic acid supplied continuously within 24 hours is preferably less than 1% by weight, more preferably less than 0.5% by weight and most preferably less than 0.2% by weight.

The purity of the acrylic acid supplied continuously is 100% by weight minus the impurities remaining in the acrylic acid in the course of acrylic acid preparation, and is determined by gas chromatography. For this purpose, the impurities detected are subtracted from 100% by weight. It should be noted here that water present in the acrylic acid cannot be determined by gas chromatography. The water content therefore has to be measured separately, for example by Karl Fischer titration, and likewise has to be subtracted. The determination of the purity of acrylic acid by means of gas chromatography is also described in the monograph "Modern Superabsorbent Polymer Technology", F. L. Buchholz and A. T. Graham, Wiley-VCH, 1998, page 121.

The present invention is based on the finding that the influence of individual impurities in the production of water-absorbing polymer particles can be compensated for by suitable measures. In order to achieve a constant product quality in a continuous process, it is therefore merely necessary to keep the concentration of the impurities substantially constant over time. The measures to compensate for the impurities therefore need not be adjusted constantly during the continuous production.

The process according to the invention therefore enables the use of acrylic acid with less complex purification, and hence much less expensive production of water-absorbing polymer particles.

The possible impurities can be divided roughly into regulating, inhibiting, crosslinking and inert impurities, and the impurities can be classified in preliminary tests on the basis of their effects.

Regulating impurities intervene into the polymerization kinetics by terminating growing polymer chains and starting new polymerization chains. This results in a rise in centrifuge retention capacity (CRC) and extractables. At the same time, there is a fall in absorption under pressure (AUL0.3 psi). The effect of regulating impurities can be compensated for, for example, by increasing the amount of crosslinker b). Such impurities may be, for example, acrolein, allyl alcohol, isopropanol, furan-2-aldehyde (2-furfural) and benzaldehyde.

Inhibiting impurities prevent or slow the polymerization. The effect of inhibiting impurities can be compensated for, for example, by increasing the amount of initiator c). Such impurities may be, for example, hydroquinone and phenothiazine.

Crosslinking impurities increase the level of crosslinking in the polymerization. This results in a fall in centrifuge retention capacity (CRC) and extractables. At the same time, there is a rise in absorption under pressure (AUL0.3 psi). The effect of crosslinking impurities can be compensated for, for example, by lowering the amount of crosslinker b). Such impurities may be, for example, allyl acrylate and allyl methacrylate.

Inert impurities have only a minor influence, if any, on the polymerization. Such impurities may be, for example, water, acetic acid and propionic acid.

The process according to the invention enables the use of acrylic acid with less complex purification. What is important is merely that the concentrations of the impurities present in the acrylic acid used vary little over time. For example, it is possible to purify acrylic acid by means of a short distillation column and, in a simple manner, to obtain acrylic acid with an elevated content of allyl acrylate and other impurities. The polymerization could then be adapted to this acrylic acid quality by simple preliminary tests. The distillation itself could then be monitored on the basis of a guide component, such as acetic acid, which means that the distillation is operated in such a way that the content of this guide component is kept constant.

In a particularly preferred embodiment of the present invention, the acrylic acid supplied continuously comprises
- at least 0.0005% by weight, preferably at least 0.001% by weight, more preferably at least 0.002% by weight and most preferably at least 0.0025% by weight, of a regulating impurity and/or
- at least 0.00005% by weight, preferably at least 0.0001% by weight, more preferably at least 0.0002% by weight and most preferably at least 0.00025% by weight, of an inhibiting impurity and/or
- at least 0.005% by weight, preferably at least 0.01% by weight, more preferably at least 0.02% by weight and most preferably at least 0.025% by weight, of a crosslinking impurity.

In a very particularly preferred embodiment of the present invention, the acrylic acid supplied continuously comprises
- from 0.0005 to 0.1% by weight, preferably from 0.001 to 0.05% by weight, more preferably from 0.002 to 0.02% by weight and most preferably from 0.0025 to 0.01% by weight of a regulating impurity and/or
- from 0.00005 to 0.1% by weight, preferably from 0.0001 to 0.05% by weight, more preferably from 0.0002 to 0.02% by weight and most preferably from 0.00025 to 0.01% by weight of an inhibiting impurity and/or
- from 0.005 to 1% by weight, preferably from 0.01 to 0.5% by weight, more preferably from 0.02 to 0.2% by weight and most preferably from 0.025 to 0.1% by weight of a crosslinking impurity.

The impurities are especially water, acetic acid, acrolein, formic acid, formaldehyde, propionic acid, furan-2-aldehyde, furan-3-aldehyde, benzaldehyde, protoanemonin, maleic anhydride, maleic acid, diacrylic acid, allyl acrylate, benzoic acid, hydroquinone and/or phenothiazine.

The water-absorbing polymer particles are produced by polymerizing a monomer solution or suspension, and are typically water-insoluble.

The proportion of acrylic acid and/or salts thereof in the total amount of monomers is preferably at least 50 mol %, more preferably at least 90 mol % and most preferably at least 95 mol %.

The acrylic acid used typically comprises polymerization inhibitors, preferably hydroquinone monoethers, as storage stabilizers.

The monomer solution therefore comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight of hydroquinone monoether, based in each case on the unneutralized acrylic acid. For example, the monomer solution can be prepared by using an acrylic acid with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the acrylic acid. In addition, polyvalent metal salts which can form coordinate bonds with at least two acid groups of the acrylic acid are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.2 to 0.6% by weight, based in each case on acrylic acid. With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with acrylic acid are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

Further ethylenically unsaturated monomers d) copolymerizable with acrylic acid are, for example, ethylenically unsaturated carboxylic acids, such as methacrylic acid and itaconic acid, and ethylenically unsaturated sulfonic acids, such as styrenesulfonic acid and 2-acrylamido-2-methylpropanesulfonic acid (AMPS).

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess acrylic acid, for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may typically be single or multistage roll mills, preferably two or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles having a particle size of greater than 150 µm is preferably at least 90% by weight, more preferably at least 95% by weight and most preferably at least 98% by weight.

Polymer particles with too small a particle size lower the permeability (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of at most 600 μm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239, 230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are hydroxide, chloride, bromide, sulfate, hydrogensulfate, carbonate, hydrogencarbonate, nitrate, phosphate, hydrogenphosphate, dihydrogenphosphate and carboxylate, such as acetate, citrate and lactate. Salts with different counterions are also possible, for example basic aluminum salts such as aluminum monoacetate or aluminum monolactate. Aluminum sulfate, aluminum monoacetate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Dryers (Hosokawa Micron GmbH; Leingarten; Germany), Hosokawa Bepex® Disc Dryers (Hosokawa Micron GmbH; Leingarten; Germany), Holo-Flite® driers (Metso Minerals Industries Inc.; Danville; USA) and Nara Paddle Dryers (NARA Machinery Europe; Frechen; Germany). Moreover, fluidized bed driers may also be used.

The drying can be effected in the mixer itself, by heating the jacket or blowing in warm air. Equally suitable is a downstream dryer, for example a shelf drier, a rotary tube oven or a heatable screw. It is particularly advantageous to effect mixing and drying in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

In a preferred embodiment of the present invention, the water-absorbing polymer particles are cooled after the thermal drying. The cooling is preferably performed in contact coolers, more preferably paddle coolers and most preferably disk coolers. Suitable coolers are, for example, Hosokawa Bepex® Horizontal Paddle Cooler (Hosokawa Micron GmbH; Leingarten; Germany), Hosokawa Bepex® Disc Cooler (Hosokawa Micron GmbH; Leingarten; Germany), Holo-Flite® coolers (Metso Minerals Industries Inc.; Danville; USA) and Nara Paddle Cooler (NARA Machinery Europe; Frechen; Germany). Moreover, fluidized bed coolers may also be used.

In the cooler, the water-absorbing polymer particles are cooled to 20 to 150° C., preferably 30 to 120° C., more preferably 40 to 100° C. and most preferably 50 to 80° C.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging. The remoisturizing is advantageously performed in the cooler after the thermal drying.

Suitable coatings for improving the free swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 0.2 to 10% by weight and most preferably 0.5 to 8% by weight, the moisture content being determined by EDANA recommended test method No. WSP 230.2-05 "Mass Loss Upon Heating".

The water-absorbing polymer particles produced by the process according to the invention have a proportion of particles having a particle size of 300 to 600 μm of preferably at least 30% by weight, more preferably at least 50% by weight and most preferably at least 70% by weight.

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Fluid Retention Capacity in Saline, After Centrifugation".

The water-absorbing polymer particles produced by the process according to the invention have an absorption under a pressure of 49.2 g/cm$^2$ of typically at least 15 g/g, preferably at least 20 g/g, more preferably at least 22 g/g, especially preferably at least 24 g/g and most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to EDANA recommended test method No. WSP 242.2-05 "Absorption Under Pressure, Gravimetric Determination", except that a pressure of 49.2 g/cm$^2$ is established instead of a pressure of 21.0 g/cm$^2$.

Methods:

The standard test methods described hereinafter and designated "WSP" are described in: "Standard Test Methods for the Nonwovens Industry", 2005 edition, published jointly by the Worldwide Strategic Partners EDANA (Avenue Eugène Plasky, 157, 1030 Brussels, Belgium, www.edana.org) and INDA (1100 Crescent Green, Suite 115, Cary, N.C. 27518, USA, www.inda.org). This publication is available both from EDANA and from INDA.

The measurements should, unless stated otherwise, be carried out at an ambient temperature of 23±2° C. and a relative air humidity of 50±10%. The water-absorbing polymer particles are mixed thoroughly before the measurement.

Centrifuge Retention Capacity

The centrifuge retention capacity (CRC) is determined by EDANA recommended test method No. WSP 241.2-05 "Fluid Retention Capacity in Saline, After Centrifugation".

Absorption Under a Pressure of 21.0 g/cm$^2$ (Absorption Under Load)

The absorption under a pressure of 21.0 g/cm$^2$ (AUL0.3 psi) of the water-absorbing polymer particles is determined by EDANA recommended test method No. WSP 242.2-05 "Absorption Under Pressure, Gravimetric Determination".

Absorption Under a Pressure of 49.2 g/cm$^2$ (Absorption Under Load)

The absorption under a pressure of 49.2 g/cm$^2$ (AUL0.7 psi) is determined analogously to EDANA recommended test method No. WSP 242.2-05 "Absorption Under Pressure, Gravimetric Determination", except that a pressure of 49.2 g/cm$^2$ (AUL0.7 psi) is established instead of a pressure of 21.0 g/cm$^2$ (AUL0.3 psi).

Extractables

The content of extractables of the water-absorbing polymer particles is determined by EDANA recommended test method No. WSP 270.2-05 "Extractable".

Purity of the Acrylic Acid

The purity determination is performed by means of a gas chromatograph with a split injector and flame ionization detector. A J&W DB FFAB 30 m×0.32 mm capillary column with a film thickness of 0.25 μm (Agilent Technologies, Waldbronn, Germany) is used. The injector temperature is 180° C. and the detector temperature is 240° C. The following temperature program is selected: 10 minutes at 120° C., then at 10° C./min to 220° C. and 15 minutes at 220° C. The split ratio is 1:100, the amount injected 0.5 μl.

Temperature program, split ratio and amount injected can vary slightly. They have to be adjusted such that a good separation and a high signal-to-noise ratio is achieved for all components.

The determination is conducted with 2-ethylhexyl acetate as an internal standard. The impurities detected are evaluated with the factor of 1 and subtracted from 100% by weight together with the water present in the acrylic acid. Water in acrylic acid is typically determined by Karl Fischer titration.

EXAMPLES

In the experiments which follow, a high-purity acrylic acid was used. The impurities examined were undetectable in the acrylic acid used.

Example 1

96 g of acrylic acid, 785 g of aqueous sodium acrylate solution (37.3% strength by weight), 115 g of deionized water and 0.66 g of 3-tuply ethoxylated glyceryl triacrylate (approx. 85% strength by weight) were freed of atmospheric oxygen by introducing nitrogen for 30 minutes. The polymerization was initiated in a 2 liter plastic vessel by adding 2.34 g of aqueous sodium peroxodisulfate solution (10.0% strength by weight), 1.50 g of aqueous ascorbic acid solution (1.0% strength by weight) and 1.50 g of aqueous hydrogen peroxide solution (1.0% strength by weight). The maximum polymerization temperature ($T_{max}$) of approx. 108° C. was attained after 14 minutes. 60 minutes after attainment of $T_{max}$, the polymer gel was removed, comminuted with a meat grinder using a 6 mm die plate, dried at 150° C. in a forced air drying cabinet for 60 minutes, then ground with a roll mill successively through gap widths of 1000 μm, 600 μm and 400 μm, and adjusted to a particle size range of 150 to 850 μm by sieving the ground material. The water-absorbing polymer particles thus obtained had a centrifuge retention capacity (CRC) of 40.3 g/g and an absorption under pressure (AUL0.3 psi) of 7.8 g/g.

Example 2

The procedure was as in example 1, except that the polymerization was performed in the presence of 100 ppm of allyl acrylate (based on acrylic acid). The water-absorbing polymer particles thus obtained had a centrifuge retention capacity (CRC) of 37.6 g/g and an absorption under pressure (AUL0.3 psi) of 8.0 g/g.

Example 3

The procedure was as in example 1, except that the polymerization was performed in the presence of 200 ppm of allyl acrylate (based on acrylic acid). The water-absorbing polymer particles thus obtained had a centrifuge retention capacity (CRC) of 36.3 g/g and an absorption under pressure (AUL0.3 psi) of 8.4 g/g.

TABLE 1

Influence of allyl acrylate (crosslinking impurity)

| | Ethoxylated glyceryl triacrylate | Allyl acrylate | CRC | AUL0.3psi |
|---|---|---|---|---|
| Ex. 1 | 0.66 g | 0 ppm | 40.3 g/g | 7.8 g/g |
| Ex. 2 | 0.66 g | 100 ppm | 37.6 g/g | 8.0 g/g |
| Ex. 3 | 0.66 g | 200 ppm | 36.3 g/g | 8.4 g/g |

The table shows that, as the amount of a crosslinking impurity rises, centrifuge retention capacity (CRC) falls and absorption under pressure (AUL0.3 psi) rises.

Example 4

The procedure was as in example 1, except that the polymerization was performed in the presence of 100 ppm of allyl acrylate (based on acrylic acid) and the amount of 3-tuply ethoxylated glyceryl triacrylate used was reduced to 0.55 g. The water-absorbing polymer particles thus obtained had a centrifuge retention capacity (CRC) of 38.9 g/g and an absorption under pressure (AUL0.3 psi) of 8.0 g/g.

Example 5

The procedure was as in example 1, except that the polymerization was performed in the presence of 100 ppm of allyl acrylate (based on acrylic acid) and the amount of 3-tuply ethoxylated glyceryl triacrylate used was reduced to 0.44 g. The water-absorbing polymer particles thus obtained had a centrifuge retention capacity (CRC) of 41.9 g/g and an absorption under pressure (AUL0.3 psi) of 7.9 g/g.

TABLE 2

Compensation for a crosslinking impurity (allyl acrylate)

| | Ethoxylated glyceryl triacrylate | Allyl acrylate | CRC | AUL0.3psi |
|---|---|---|---|---|
| Ex. 2 | 0.66 g | 100 ppm | 37.6 g/g | 8.0 g/g |
| Ex. 4 | 0.55 g | 100 ppm | 38.9 g/g | 8.0 g/g |
| Ex. 5 | 0.44 g | 100 ppm | 41.9 g/g | 7.9 g/g |

The table shows that the influence of the crosslinking impurity can be compensated for by adjusting the amount of crosslinker.

Example 6

96 g of acrylic acid, 785 g of aqueous sodium acrylate solution (37.3% strength by weight), 115 g of deionized water and 0.88 g of 3-tuply ethoxylated glyceryl triacrylate (approx. 85% strength by weight) were freed of atmospheric oxygen by introducing nitrogen for 30 minutes. The polymerization was initiated in a 2 liter plastic vessel by adding 0.78 g of aqueous sodium peroxodisulfate solution (5.0% strength by weight), 0.50 g of aqueous ascorbic acid solution (0.5% strength by weight) and 0.50 g of aqueous hydrogen peroxide solution (0.5% strength by weight). The maximum polymerization temperature ($T_{max}$) of approx. 106° C. was attained after 30 minutes. 60 minutes after attainment of $T_{max}$, the polymer gel was removed, comminuted with a meat grinder using a 6 mm die plate, dried at 150° C. in a forced air drying cabinet for 60 minutes, then ground with a roll mill successively through gap widths of 1000 μm, 600 μm and 400 μm, and adjusted to a particle size range of 150 to 850 μm by sieving the ground material. The water-absorbing polymer particles thus obtained had a centrifuge retention capacity (CRC) of 29.2 g/g, an absorption under pressure (AUL0.3 psi) of 16.3 g/g and an absorption under high pressure (AUL0.7 psi) of 8.0 g/g.

Example 7

The procedure was as in example 6, except that the polymerization was performed in the presence of 1 ppm of phenothiazine (based on acrylic acid). After 30 minutes the polymerization temperature was well below 100° C. and did not reach 100° C. even after a further 60 minutes, and the mixture could not be processed any further due to insufficient polymerization.

The example shows that polymerization of the monomer solution is no longer possible in the presence of an inhibiting impurity.

Example 8

The polymerization performed in the presence of 1 ppm of phenothiazine (example 7) was repeated, but with an increased amount of polymerization initiators. The following were used: 0.89 g of aqueous sodium peroxodisulfate solution (5.0% strength by weight), 0.57 g of aqueous ascorbic acid solution (0.5% strength by weight) and 0.57 g of aqueous hydrogen peroxide solution (0.5% strength by weight). After further workup, as described in example 7, the water-absorbing polymer particles thus obtained had a centrifuge retention capacity (CRC) of 31.9 g/g, an absorption under pressure (AUL0.3 psi) of 17.7 g/g and an absorption under high pressure (AUL0.7 psi) of 7.8 g/g.

Example 9

The polymerization performed in the presence of 1 ppm of phenothiazine (example 7) was repeated, but with an increased amount of polymerization initiators. The following were used: 1.01 g of aqueous sodium peroxodisulfate solution (5.0% strength by weight), 0.65 g of aqueous ascorbic acid solution (0.5% strength by weight) and 0.65 g of aqueous hydrogen peroxide solution (0.5% strength by weight). After further workup, as described in example 7, the water-absorbing polymer particles thus obtained had a centrifuge retention capacity (CRC) of 32.0 g/g, an absorption under pressure (AUL0.3 psi) of 13.1 g/g and an absorption under high pressure (AUL0.7 psi) of 7.6 g/g.

Example 10

The polymerization performed in the presence of 1 ppm of phenothiazine (example 7) was repeated, but with an increased amount of polymerization initiators. The following were used: 1.17 g of aqueous sodium peroxodisulfate solution (10.0% strength by weight), 0.75 g of aqueous ascorbic acid solution (1.0% strength by weight) and 0.75 g of aqueous hydrogen peroxide solution (1.0% strength by weight). 30 minutes after initiation of the polymerization, the polymerization temperature was about 105° C. and had in fact reached $T_{max}$ at about 105° C. After further workup, as described in example 7, the water-absorbing polymer particles thus obtained had a centrifuge retention capacity (CRC) of 35.8 g/g, an absorption under pressure (AUL0.3 psi) of 9.3 g/g and an absorption under high pressure (AUL0.7 psi) of 7.5 g/g.

TABLE 3

Compensation for an inhibiting impurity (phenothiazine)

| | Polymerization initiator | Pheno-thiazine | CRC | AUL0.3psi | AUL0.7psi |
|---|---|---|---|---|---|
| Ex. 6 | 100% | 0 ppm | 29.2 g/g | 16.3 g/g | 8.0 g/g |
| Ex. 7 | 100% | 1 ppm | —*) | —*) | —*) |
| Ex. 8 | 114% | 1 ppm | 31.9 g/g | 17.7 g/g | 7.8 g/g |
| Ex. 9 | 130% | 1 ppm | 32.0 g/g | 13.1 g/g | 7.6 g/g |
| Ex. 10 | 300% | 1 ppm | 35.8 g/g | 9.3 g/g | 7.5 g/g |

*)incomplete polymerization

The table shows that the influence of the inhibiting impurity can be compensated for by adjusting the amount of initiator.

Example 11

96 g of acrylic acid, 785 g of aqueous sodium acrylate solution (37.3% strength by weight), 115 g of deionized water and 0.88 g of 3-tuply ethoxylated glyceryl triacrylate (approx. 85% strength by weight) were freed of atmospheric oxygen by introducing nitrogen for 30 minutes. The polymerization was initiated in a 2 liter plastic vessel by adding 2.34 g of aqueous sodium peroxodisulfate solution (2.0% strength by weight), 2.40 g of aqueous ascorbic acid solution (0.2% strength by weight) and 2.00 g of aqueous hydrogen peroxide solution (1.0% strength by weight). A maximum polymerization temperature ($T_{max}$) of approx. 110° C. was attained. 60 minutes after attainment of $T_{max}$, the polymer gel was removed, comminuted with a meat grinder using a 6 mm die plate, dried at 150° C. in a forced air drying cabinet for 60 minutes, then ground with a roll mill successively through gap widths of 1000 μm, 600 μm and 400 μm, and adjusted to a particle size range of 150 to 850 μm by sieving the ground material. The water-absorbing polymer particles thus obtained had a centrifuge retention capacity (CRC) of 35.4 g/g, an absorption under pressure (AUL0.3 psi) of 9.6 g/g and 13.9% by weight of extractables.

Example 12

The procedure was as in example 11, except that the polymerization was performed in the presence of 10 ppm of allyl alcohol (based on acrylic acid). The water-absorbing polymer particles thus obtained had a centrifuge retention capacity (CRC) of 36.6 g/g, an absorption under pressure (AUL0.3 psi) of 8.5 g/g and 14.1% by weight of extractables.

Example 13

The procedure was as in example 11, except that the polymerization was performed in the presence of 10 ppm of allyl alcohol (based on acrylic acid) and the amount of 3-tuply ethoxylated glyceryl triacrylate used was increased to 0.97 g. The water-absorbing polymer particles thus obtained had a centrifuge retention capacity (CRC) of 34.1 g/g, an absorption under pressure (AUL0.3 psi) of 10.9 g/g and 11.5% by weight of extractables.

Example 14

The procedure was as in example 11, except that the polymerization was performed in the presence of 10 ppm of allyl alcohol (based on acrylic acid) and the amount of 3-tuply ethoxylated glyceryl triacrylate used was increased to 1.06 g. The water-absorbing polymer particles thus obtained had a centrifuge retention capacity (CRC) of 33.7 g/g, an absorption under pressure (AUL0.3 psi) of 12.0 g/g and 11.4% by weight of extractables.

TABLE 4

Compensation for a regulating impurity (allyl alcohol)

| | Ethoxylated glyceryl triacrylate | Allyl alcohol | CRC | AUL0.3psi | Extractables |
|---|---|---|---|---|---|
| Ex. 11 | 0.88 g | 0 ppm | 35.4 g/g | 9.6 g/g | 13.9% by wt. |
| Ex. 12 | 0.88 g | 10 ppm | 36.6 g/g | 8.5 g/g | 14.1% by wt. |
| Ex. 13 | 0.97 g | 10 ppm | 34.1 g/g | 10.9 g/g | 11.5% by wt. |
| Ex. 14 | 1.06 g | 10 ppm | 33.7 g/g | 12.0 g/g | 11.4% by wt. |

The table shows that the influence of the regulating impurity can be compensated for by adjusting the amount of crosslinker.

Example 15

The procedure was as in example 11. The water-absorbing polymer particles thus obtained had a centrifuge retention capacity (CRC) of 35.6 g/g, an absorption under pressure (AUL0.3 psi) of 9.2 g/g and 13.5% by weight of extractables.

Example 16

The procedure was as in example 11, except that the polymerization was performed in the presence of 10 ppm of acrolein (based on acrylic acid). The water-absorbing polymer particles thus obtained had a centrifuge retention capacity (CRC) of 37.4 g/g, an absorption under pressure (AUL0.3 psi) of 8.4 g/g and 14.7% by weight of extractables.

Example 17

The procedure was as in example 11, except that the polymerization was performed in the presence of 10 ppm of acrolein (based on acrylic acid) and the amount of 3-tuply ethoxylated glyceryl triacrylate used was increased to 0.97 g. The water-absorbing polymer particles thus obtained had a centrifuge retention capacity (CRC) of 35.5 g/g, an absorption under pressure (AUL0.3 psi) of 9.8 g/g and 12.1% by weight of extractables.

Example 18

The procedure was as in example 11, except that the polymerization was performed in the presence of 10 ppm of acrolein (based on acrylic acid) and the amount of 3-tuply ethoxylated glyceryl triacrylate used was increased to 1.06 g. The water-absorbing polymer particles thus obtained had a centrifuge retention capacity (CRC) of 34.7 g/g, an absorption under pressure (AUL0.3 psi) of 10.3 g/g and 11.3% by weight of extractables.

TABLE 5

Compensation for a regulating impurity (acrolein)

| | Ethoxylated glyceryl triacrylate | Acrolein | CRC | AUL0.3psi | Extractables |
|---|---|---|---|---|---|
| Ex. 15 | 0.88 g | 0 ppm | 35.6 g/g | 9.2 g/g | 13.5% by wt. |
| Ex. 16 | 0.88 g | 10 ppm | 37.4 g/g | 8.4 g/g | 14.7% by wt. |
| Ex. 17 | 0.97 g | 10 ppm | 35.5 g/g | 9.8 g/g | 12.1% by wt. |
| Ex. 18 | 1.06 g | 10 ppm | 34.7 g/g | 10.3 g/g | 11.3% by wt. |

The table shows that the influence of the regulating impurity can be compensated for by adjusting the amount of crosslinker.

Example 19

The procedure was as in example 11. The water-absorbing polymer particles thus obtained had a centrifuge retention capacity (CRC) of 35.5 g/g, an absorption under pressure (AUL0.3 psi) of 9.5 g/g and 13.2% by weight of extractables.

Example 20

The procedure was as in example 11, except that the polymerization was performed in the presence of 10 ppm of 2-furfural (based on acrylic acid). The water-absorbing polymer particles thus obtained had a centrifuge retention capacity (CRC) of 36.2 g/g, an absorption under pressure (AUL0.3 psi) of 9.2 g/g and 14.0% by weight of extractables.

Example 21

The procedure was as in example 11, except that the polymerization was performed in the presence of 10 ppm of 2-furfural (based on acrylic acid) and the amount of 3-tuply ethoxylated glyceryl triacrylate used was increased to 0.97 g. The water-absorbing polymer particles thus obtained had a centrifuge retention capacity (CRC) of 34.6 g/g, an absorption under pressure (AUL0.3 psi) of 10.4 g/g and 12.5% by weight of extractables.

Example 22

The procedure was as in example 11, except that the polymerization was performed in the presence of 10 ppm of 2-furfural (based on acrylic acid) and the amount of 3-tuply ethoxylated glyceryl triacrylate used was increased to 1.06 g. The water-absorbing polymer particles thus obtained had a centrifuge retention capacity (CRC) of 34.0 g/g, an absorption under pressure (AUL0.3 psi) of 10.7 g/g and 12.0% by weight of extractables.

TABLE 6

Compensation for a regulating impurity (2-furfural)

| | Ethoxylated glyceryl triacrylate | 2-Furfural | CRC | AUL0.3psi | Extractables |
|---|---|---|---|---|---|
| Ex. 19 | 0.88 g | 0 ppm | 35.5 g/g | 9.5 g/g | 13.2% by wt. |
| Ex. 20 | 0.88 g | 10 ppm | 36.2 g/g | 9.2 g/g | 14.0% by wt. |
| Ex. 21 | 0.97 g | 10 ppm | 34.6 g/g | 10.4 g/g | 12.5% by wt. |
| Ex. 22 | 1.06 g | 10 ppm | 34.0 g/g | 10.7 g/g | 12.0% by wt. |

The table shows that the influence of the regulating impurity can be compensated for by adjusting the amount of crosslinker.

The invention claimed is:

1. A process for continuously producing water-absorbing polymer particles, comprising the polymerization of a monomer solution or suspension comprising
   a) acrylic acid which may be at least partly neutralized,
   b) at least one crosslinker,
   c) at least one initiator,
   d) optionally one or more ethylenically unsaturated monomer copolymerizable with acrylic acid,
   e) optionally one or more water-soluble polymer, and
   f) water,
to give a polymer gel, drying of the resulting polymer gel, comminuting the dried polymer gel to give polymer particles, and classifying the resulting polymer particles, wherein the acrylic acid a) being polymerized is supplied continuously and the acrylic acid a) being polymerized and supplied continuously has a purity of less than 99.8% by weight and the purity of the acrylic acid a) being polymerized and supplied continuously varies by less than 2% by weight within 24 hours.

2. The process according to claim 1, wherein the acrylic acid a) being polymerized and supplied continuously has a purity of 90 to 99% by weight.

3. The process according to claim 1, wherein the purity of the acrylic acid a) supplied continuously varies by less than 0.5% by weight within 24 hours.

4. The process according to claim 1, wherein the acrylic acid a) supplied continuously comprises
at least 0.0005% by weight of a regulating impurity and/or
at least 0.00005% by weight of an inhibiting impurity and/or
at least 0.005% by weight of a crosslinking impurity.

5. The process according to claim 1, wherein the acrylic acid a) supplied continuously comprises
from 0.001 to 0.05% by weight of a regulating impurity and/or
from 0.0001 to 0.05% by weight of an inhibiting impurity and/or
from 0.05 to 0.5% by weight of a crosslinking impurity.

6. The process according to claim 1, wherein the acrylic acid a) has been neutralized to an extent of 25 to 95 mol %.

7. The process according to claim 1, wherein the impurity is water, acetic acid, acrolein, formic acid, formaldehyde, propionic acid, furan-2-aldehyde, furan-3-aldehyde, benzaldehyde, protoanemonin, maleic anhydride, maleic acid, diacrylic acid, allyl acrylate, benzoic acid, hydroquinone monomethyl ether, hydroquinone, and/or phenothiazine.

8. The process according to claim 1, wherein the water-absorbing polymer particles have a moisture content of at most 15% by weight.

9. The process according to claim 1, wherein at least 95% by weight of the water-absorbing polymer particles have a particle size of greater than 150 μm.

10. The process according to claim 1, wherein at least 95% by weight of the water-absorbing polymer particles have a particle size not exceeding 850 μm.

11. The process according to claim 1, wherein the water-absorbing polymer particles have a centrifuge retention capacity of at least 15 g/g.

12. The process according to claim 1, wherein the water-absorbing polymer particles are surface postcrosslinked after classifying.

13. The process according to claim 1 wherein the acrylic acid a) being polymerized and supplied continuously has a purity of 80 to 99.5%, by weight.

14. The process according to claim 13 wherein the acrylic acid a) being polymerized and supplied continuously has a purity of 95 to 98%, by weight.

15. The process according to claim 1 wherein the purity of the acrylic acid a) being polymerized and supplied continuously varies by less than 1% by weight within 24 hours.

16. The process according to claim 15 wherein the purity of the acrylic acid a) being polymerized and supplied continuously varies by less than 0.5% by weight within 24 hours.

17. The process according to claim 16 wherein the purity of the acrylic acid a) being polymerized and supplied continuously varies by less than 0.2% by weight within 24 hours.

* * * * *